United States Patent [19]

Chapman

[11] 4,328,952
[45] May 11, 1982

[54] APPARATUS AND METHODS FOR LINE STRINGING

[76] Inventor: Claude L. Chapman, 3300 W. Union, Englewood, Colo. 80110

[21] Appl. No.: 103,348

[22] Filed: Dec. 13, 1979

[51] Int. Cl.³ .............................................. B66D 1/36
[52] U.S. Cl. .......................................... 254/134.3 R
[58] Field of Search ................ 254/134.3 R, 134.3 PA

[56] References Cited

U.S. PATENT DOCUMENTS 1,640,667 8/1927 Osborn .
3,845,937 11/1974 Johnson et al. .
4,006,884 2/1977 Lederhos et al. ......... 254/134.3 PA
4,247,084 1/1981 Lindsey et al. .

FOREIGN PATENT DOCUMENTS 2648255 5/1977 Fed. Rep. of Germany .

*Primary Examiner*—Robert C. Watson
*Attorney, Agent, or Firm*—Ancel W. Lewis, Jr.

[57] ABSTRACT

The problem of stringing power transmission lines via a line-holding structure that has an upper cross support and no side access, such as the center strand under a cross support on a tower, is solved by the methods and apparatus disclosed. The stringing apparatus is carried in a depending manner from the aircraft by a hoist line and enables the insertion of a sock line through the line-holding structure, followed by the pulling of the line therethrough. Different forms of the stringing apparatus enable an insertion with a needle-type structure, a pull-push structure, a pivoting gate structure, and a rotary annular carrier or ring segment structure. After the sock line has been strung, one end is secured to a power line which is then threaded through the line-holding structure to complete the stringing of a center strand of power line.

13 Claims, 16 Drawing Figures

U.S. Patent May 11, 1982 Sheet 1 of 5 4,328,952
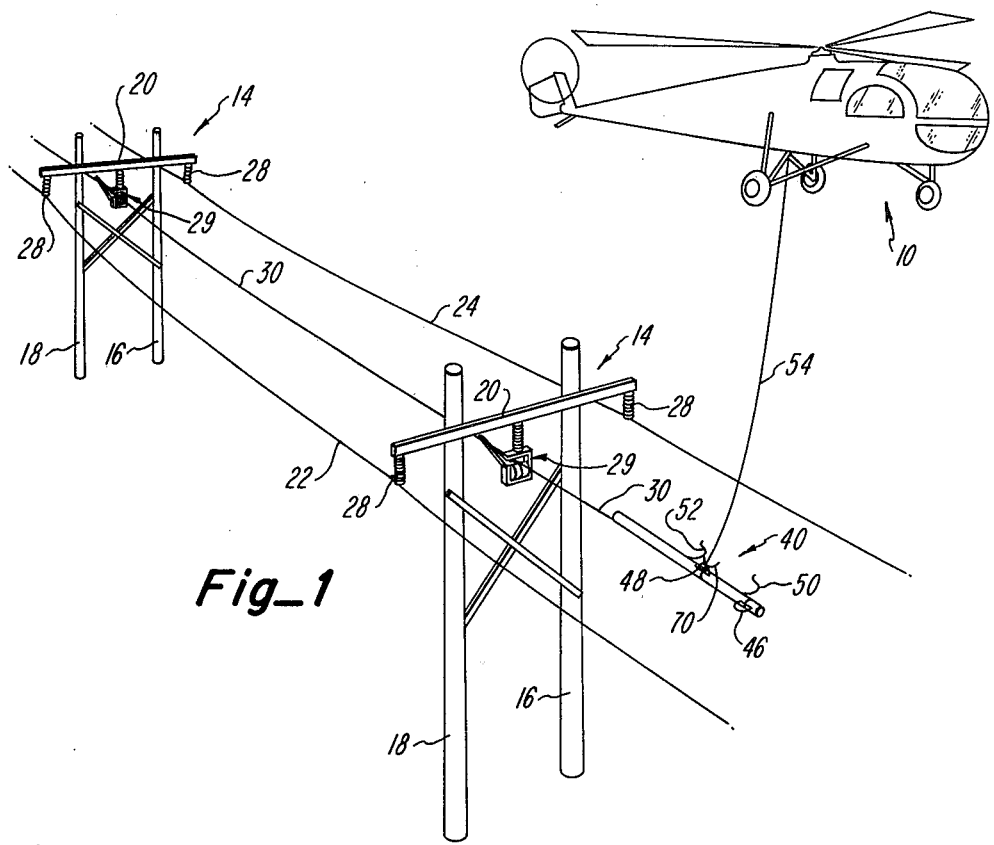
Fig_1
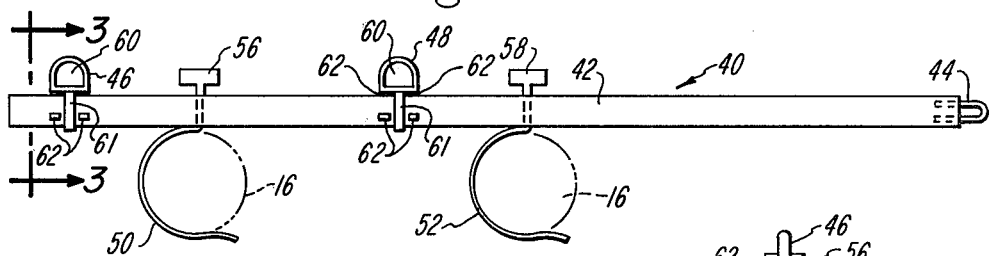
Fig_2
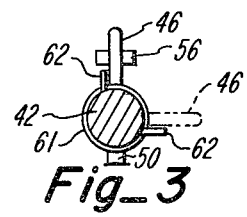
Fig_3
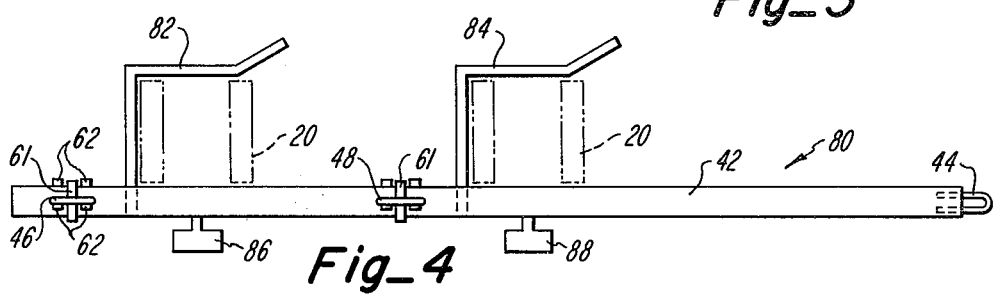
Fig_4

U.S. Patent May 11, 1982 Sheet 2 of 5 4,328,952
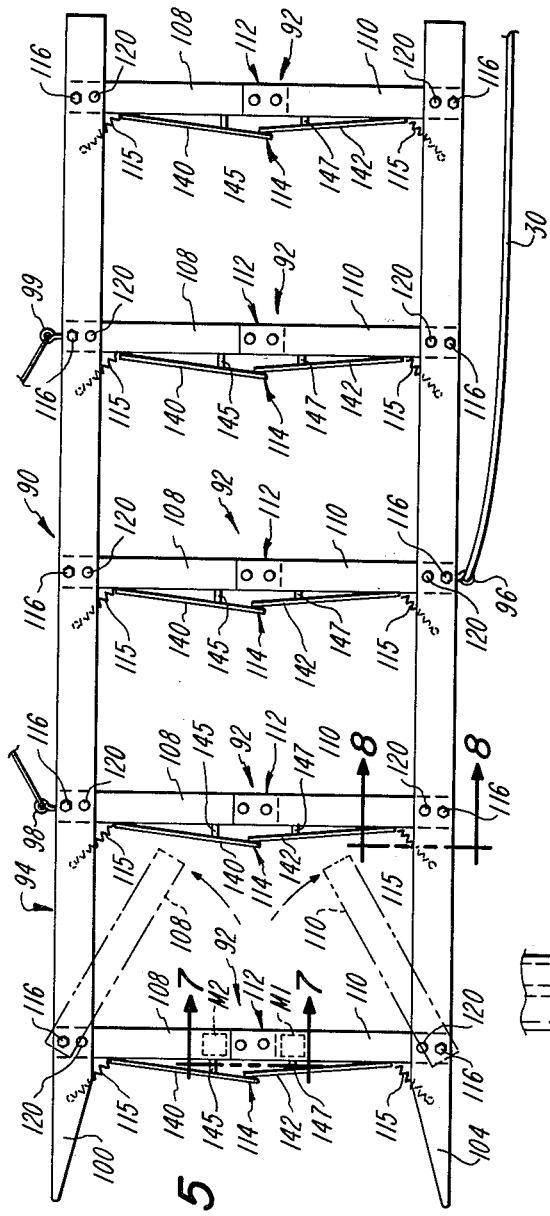
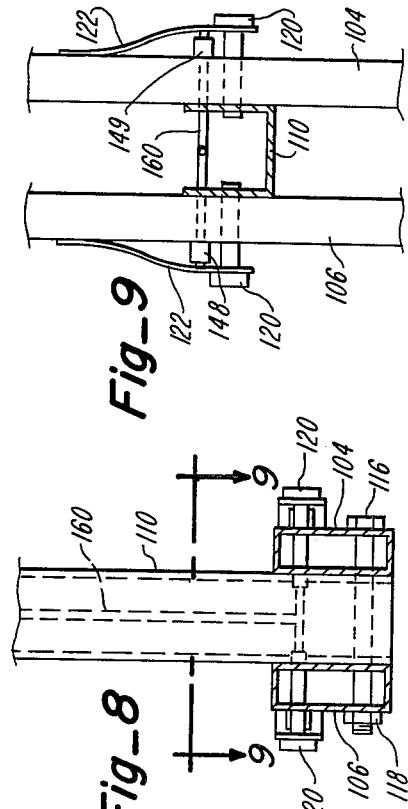
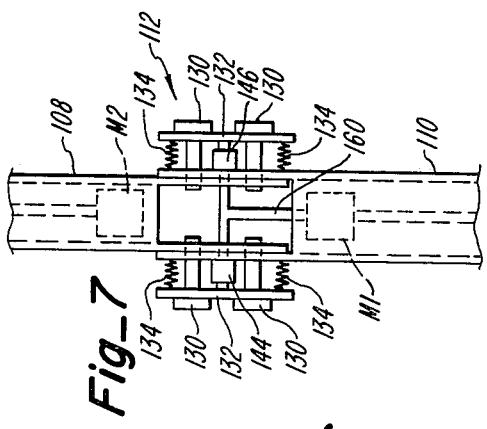
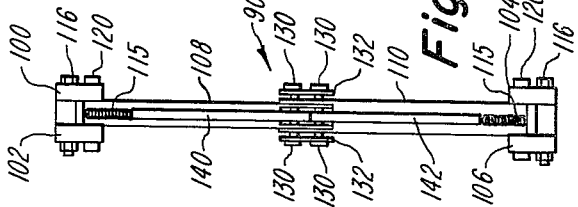

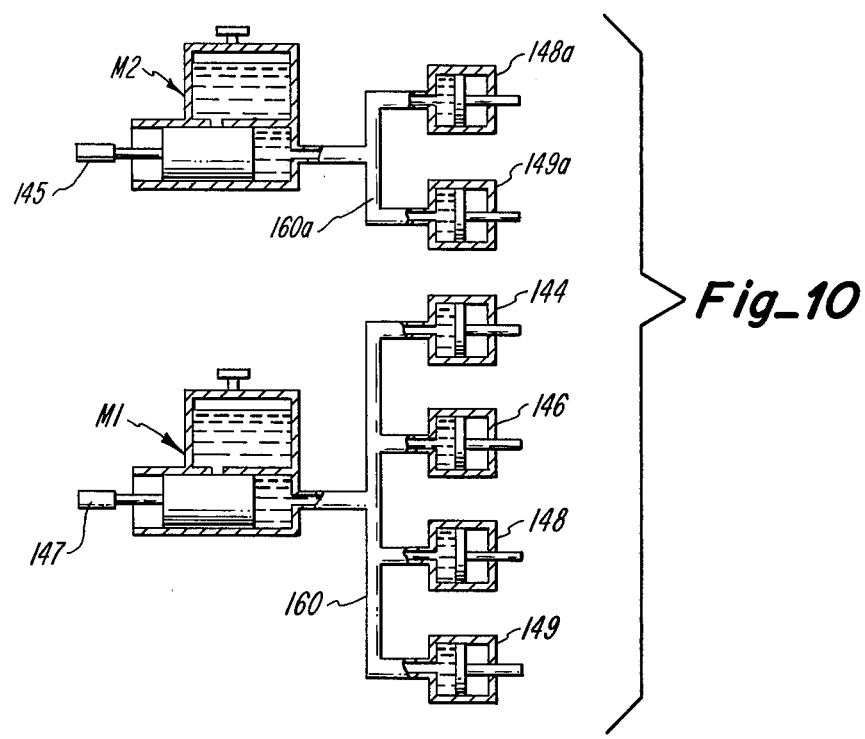
Fig_10

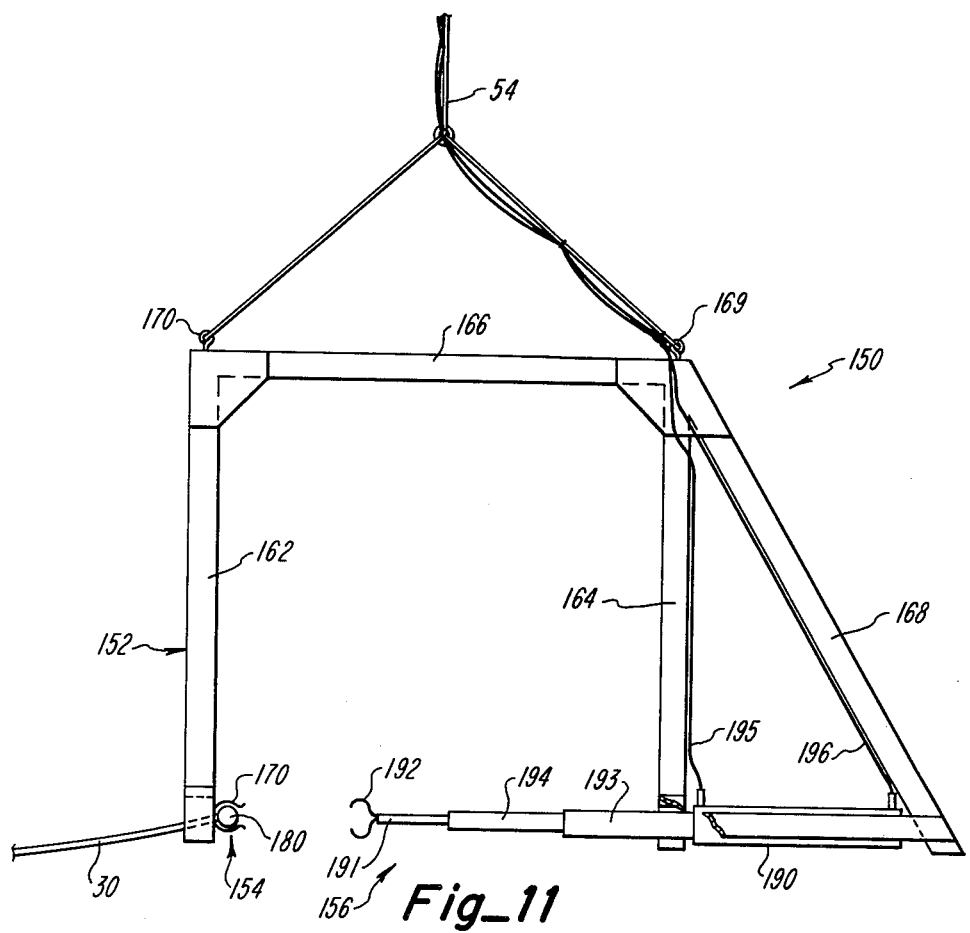
Fig_11
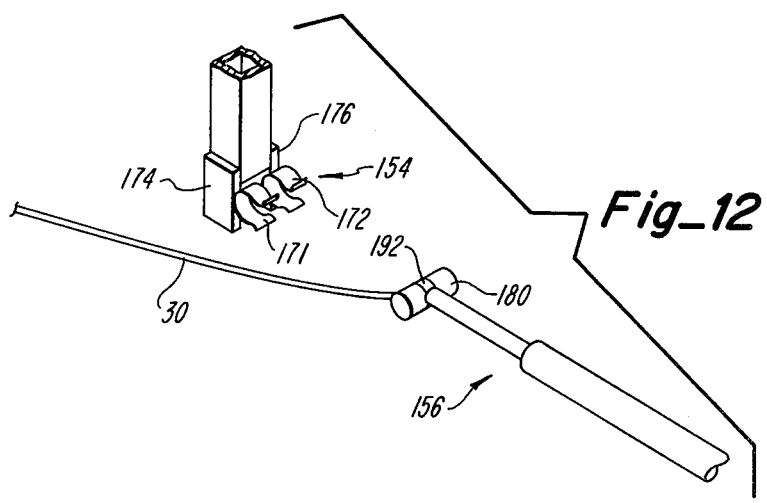
Fig_12

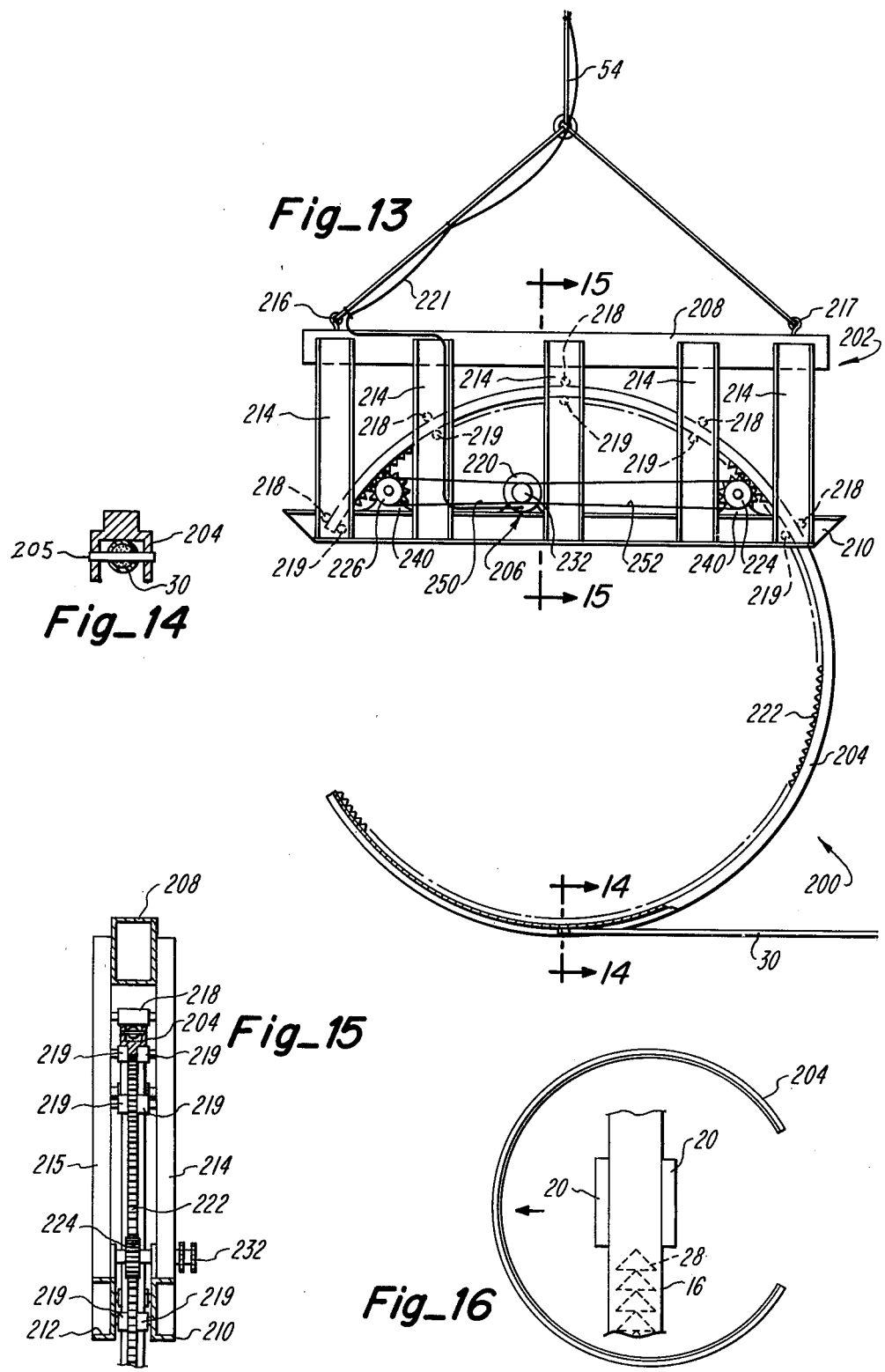

APPARATUS AND METHODS FOR LINE STRINGING

TECHNICAL FIELD

This invention relates to novel and improved methods and apparatus for line stringing that is partucularly suited for stringing line through towers with line-holding structure that has no side access such as for the stringing of a center line.

BACKGROUND ART

The advantages of stringing electric power lines by helicopter or the like are well known. In the past for airborne stringing of power lines the practice has been to provide blocks on the support towers through which the personnel in the helicopter can readily string the power line.

The use of helicopters and suitable stringing apparatus and methods as presently known have been confined to towers having a side access as illustrated in U.S. Pat. No. 4,129,287. There are, however, a number of towers presently in use and designed for future use wherein the center power line is entirely closed on all sides at the point of attachment, and this, of course, poses particular problems for stringing by helicopter or the like. The present prior art approach is to use conventional ground equipment.

DISCLOSURE OF INVENTION

In accordance with the present invention there are disclosed apparatus and methods using an aircraft for passing a sock line through a line-holding structure for the center power line of a series of towers. A needle-type apparatus uses a pair of tower catches and a pair of line fasteners on a common support member to thread the line. A gate-type apparatus uses pivotal gates between upper and lower supports that sequentially open and close to thread the line. A ram-type apparatus uses a pull-push motion to thread the line. A ring-type apparatus has the ring segment rotate about its axis to thread the line. The methods include suspending the line, which is typically a sock line, from an aircraft and threading the sock line through a line-holding structure, all of which are carried out by the operator in the aircraft, followed by attaching the sock line to the power line and a pulling of the power line through the line-holding structure.

BRIEF DESCRIPTION OF DRAWINGS

The details of this invention will be described in connection with the accompanying drawings, in which:

FIG. 1 is a perspective view of a helicopter supporting a needle-type stringing apparatus for stringing a line to towers;

FIG. 2 is a top plan view of the needle-type stringing apparatus shown in FIG. 1;

FIG. 3 is a sectional view taken along lines 3—3 of FIG. 2;

FIG. 4 is a side elevational view of an alternative embodiment of a needle-type apparatus;

FIG. 5 is a side elevational view of a gate-type stringing apparatus;

FIG. 6 is an end view of FIG. 5;

FIG. 7 is a cross-sectional view taken along section line 7—7 of FIG. 5;

FIG. 8 is a cross-sectional view taken along section line 8—8 of FIG. 5;

FIG. 9 is a cross-sectional view taken along section line 9—9 of FIG. 8;

FIG. 10 is a schematic diagram of the hydraulic system used in the apparatus shown in FIGS. 5–9;

FIG. 11 is a side elevational view of a ram-type stringing apparatus;

FIG. 12 is an enlarged perspective view of a portion of FIG. 11;

FIG. 13 is a side elevational view of a ring-type stringing apparatus;

FIG. 14 is a sectional view taken along lines 14—14 of FIG. 13;

FIG. 15 is a cross-sectional view taken along section line 13—13 of FIG. 12; and FIG. 16 is a line diagram showing the ring segment in the rotated position.

DETAILED DESCRIPTION

Referring now to FIG. 1, a helicopter 10 is shown stringing a line 30 to a series of towers 14 disposed at spaced intervals. The towers 14 are conventional high-tension towers having a pair of laterally spaced vertical poles 16 and 18 that are anchored to the ground and a cross support 20 attached at the top of the vertical poles 16 and 18 for supporting the strands of the high tension power line. The towers 14 are illustrated as having generally cylindrically shaped poles 16 and 18 and a generally rectangularly shaped cross support 20. It is understood that the apparatus and method of the invention may be used with a variety of types of towers and only one pole instead of two may be used per tower.

As illustrated, the cross supports 20 of the towers 14 are adapted to support three strands of high tension electric power line, two outside strands 22 and 24 are shown and a procedure for stringing the center or middle strand is described herein. The structure being threaded for the center strand has no top, bottom, or side access and is also referred to herein as "window-like." The outside strands of power line 22 and 24 are attached to the cross support 20 utilizing a conventional electric insulator 28, as will be the middle strand of power line upon completion of the installation. In practice, a stringing block 29 or like line-holding structure is mounted on the lower end of each insulator 28 to facilitate the stringing operation. Blocks of this type are disclosed in U.S. Pat. Nos. 4,129,287 and 3,195,862.

For installing the center strand of power line, a preliminary stringing line commonly known as and herein referred to as sock line 30 is unrolled continuously from a large spool supported on the ground at one end of the series of towers being strung, using the stringing apparatus of the present invention. Line 30 is also referred to herein as the "threading line." The sock line 30 is strung the entire length of the series of towers and has an end coupling that is connected to an end of the center strand of power line or conductor.

A winch-type puller on the ground is used to pull the sock line 30 back to its original position and thereby threads the power line connected thereto through the line-holding structure that had previously been occupied by the sock line 30. During the threading of the power line through the line holding structure it is maintained in tension by conventional tensioner apparatus on the ground.

While it is understood that the methods and apparatus of the present invention are suitable for directly stringing at least relatively short lengths of power line, the weight of a typical length of power line would be too great for lifting by the aircraft. In addition, power line or electrical conductor is vulnerable to nicks and scratches. The sock line 30 is considerably lighter and more durable and typically is in the nature of a stranded cable made of strong, light wieght materials such as steel, nylon, polyethylene and the like. A needle-type stringing apparatus 40 shown in FIGS. 1 and 2, generally stated, comprises a support member 42 in the form of an elongated cylindrically shaped rod, a generally U-shaped sock line fastener 44 attached at the rear end of support member 42, a front or leading hoist line fastener or coupling portion 46 attached at the front end portion of the support member 42, and a trailing or rear hoist line fastener or coupling portion 48 attached to the support member a selected distance rearwardly of fastener 46 and between fastener 44 and fastener 46 for attaching the stringing apparatus 40 to a hoist line 54 depending from the helicopter 10 or like aircraft. Support member 42 is also referred to herein as a "threading member" and as shown has a leading end and a trailing end. A front hook-shaped tower catch 50 is mounted on support member 42 behind fastener 46 and a rear hook-shaped tower catch 52 is mounted on member 42 rearwardly of fastener 48. Catch 50 is between fasteners 46 and 48. The function of catches 50 and 52 is to catch hold of and temporarily secure the stringing apparatus to the support tower as the tension in the line 30 pulls one of the catches 50 or 52 against the support tower.

Counterweights 56 and 58 are shown mounted on support member 42 directly opposite catches 50 and 52, respectively, to counterbalance the associated catches for ensuring that the catches are disposed in a horizontal plane and not turned at an angle so as to readily catch the tower pole 16.

The line fasteners 46 and 48, respectively, are thus located axially in front of catches 50 and 52, respectively. Each line fastener 46 and 48 includes a generally U-shaped eyelet or lug portion 60 on a ring-shaped base portion 61 that in turn is rotatably mounted on support member 42. Stops 62 are provided for each fastener 46 and 48 and are attached to the support member 42 on either side of the body to limit the axial movement of the fasteners with respect to the support member and also limit the rotational movement of the fasteners to 90° with respect to the support member so that the lug portion will rotate between a horizontal position ready for being hooked and a vertical position when it is hooked and carried by the hoist line.

The catches 50 and 52 are located opposite the lug portions 60 when the lug portions are in the horizontal position and swing to the vertical position at right angles to the catches so that the catches will catch hold of the sides of vertical poles. The stops 62 are attached to the support member at a point approximately even with the attachment point of the catches 50 and 52 to the support member.

As shown in FIG. 1, a grappling hook 70 or similar device may be attached to the hoist line 54 for releasably attaching the hoist line 54 to the fasteners 46 and 48 of the needle-type stringing apparatus 40. The grappling hook 70 and each of the fasteners 46 and 48 then form a releasable coupling between the hoist line 54 and the threading member 40.

The catches 50 and 52 of the stringing apparatus 40 are generally hook-shaped and are constructed to temporarily secure the apparatus 40 to a generally cylindrical vertical pole 16 of the tower 14 and support the sock line 30 while the sock line is threaded through the tower 14.

The stringing apparatus 40 is adapted to string the sock line through a series of tower supports 14 by a method that generally includes the steps of pulling the stringing apparatus 40 with the sock line 30 attached thereto between the towers 14 with the hoist line 54 of the helicopter 10 supporting the stringing apparatus 40 on a tower 14 while the stringing apparatus 40 is released from the hoist line 54, flying the helicopter 10 and hoist line 54 around the tower 14, reattaching the hoist line 54 to the stringing apparatus 40 on the opposite side of the tower 14, and then pulling the stringing apparatus 40 and sock line 30 through the tower 14. Finally, after the sock line has been strung through all of the towers, one end is secured to the power line and the power line is threaded through the support structure to replace the sock line.

More specifically, the method is preferably carried out by first fastening the sock line 30 to sock line fastener 44. The grappling hook 70 of the helicopter haul line 54 is attached to the rear hoist line fastener 48 for pulling the stringing apparatus through the air. The airborne stringing apparatus is then pulled through the tower 14 and the leading tower catch 50 of the apparatus is hooked around a support pole 16 on the tower 14. The tension on the sock line 30 helps to maintain the stringing apparatus 40 in position on the pole 16.

The hoist line 54 is then released from the rear fastener 48 and the helicopter flies the hoist line 54 around to the opposite side of the tower 14. The hoist line 54 is then reattached to the front hoist line fastener 46 and the helicopter 10 pulls the stringing apparatus 40 through the tower 14 and hooks catch 52 to the tower pole 16. The hoist line 54 is then released from front hoist line fastener 46 and is reattached to rear hoist line fastener 48. The stringing apparatus 40 can then be pulled through the tower 14 by the aircraft and the operation can be repeated at the next tower.

Referring now to FIG. 3, another embodiment of the needle-type stringing apparatus is shown and is generally designated 80. Apparatus 80 is formed with generally square-shaped front and rear tower catches 82 and 84. The catches 82 and 84 have front and rear hoist line fasteners that are located with the lug portion on the same side of the support member when the lug portion is in the horizontal position so that the catches will catch hold of the cross support 20 of the tower. Counterweights 86 and 88 are shown mounted on support member 42 directly opposite catches 82 and 84, respectively, to counterbalance the associated catches. The lug portions swing 90° from a horizontal to a vertical position when supported by the hoist line. This arrangement functions in the same manner as previously described except that during operation of the apparatus the square-shaped tower catches 82 and 84 are designed to support the apparatus on the generally rectangularly shaped cross support member 20 of the tower 14 rather than on the vertical tower poles 16 and 18.

Referring now to FIGS. 5–9, a gate-type stringing apparatus 90 is formed with a plurality of gate assemblies 92 that, generally stated, allow the apparatus to pass along the tower with a lower portion or threading member 104, 106 passing under the cross support 20 of the tower 14 for passing a sock line 30 through the line-holding structure. Stringing apparatus 90 comprises a support member 94 in the form of an elongated rigid frame, a plurality of collapsing gate assemblies 92 mounted to the support member 94, a sock line fastener 96 on the bottom of the support member for attaching the sock line 30 to the apparatus, and two hoist line fasteners 98 and 99 at spaced intervals on the top of the support member for attaching the apparatus to the hoist line 54 depending from the helicopter.

The support member 94 for the apparatus has an upper support portion including a pair of laterally spaced upper supports 100 and 102 fabricated from generally rectangular steel tubing and a lower support portion having a pair of laterally spaced lower supports 104 and 106 also fabricated from generally rectangular steel tubing. The supports 100, 102, 104 and 106 are tapered at the front to allow the apparatus to be more easily guided as the cross support 20 passes between the upper supports and lower supports.

The gate assemblies 92 are mounted between the upper supports 100 and 102 and the lower supports 104 and 106 and in one position serve to hold these upper and lower supports in a parallel spaced relationship. Each gate assembly 92, generally stated, includes a pivotally mounted upper arm 108, a pivotally mounted lower arm 110, a latch assembly 112 for latching the upper arm 108 and lower arm 110 together at adjacent end portions, and a hydraulic system 114 for selectively opening and closing the gates as required in response to a contact by the cross support 20. The gates are shown in fathom lines in their open position. While hydraulic power is shown and described as one form of motive power for opening and closing the gates, it is understood that other forms of motive power such as springs, cylinders, electric motors and the like are within the spirit and scope of the present invention.

The gate arms 108 and 110 are pivotally mounted to the pairs of upper supports 100 and 102 and lower frame supports 104 and 106, respectively, on pivot bolts 116 (FIG. 7) fixedly secured in holes in the supports by nuts 118 opposite the bolt heads. More specifically, the upper gate arm 108 pivots about an upper pivot extending between and supported by the upper supports at its upper end and the lower gate arm 110 pivots about a lower pivot extending between and supported by the upper supports at its lower end. Each gate arm 108 and 110 is biased in the closed position by a tension spring 115 attached to the gate arm 108 or 110 and to the associated frame support. In the closed position the adjacent lower and upper ends of the upper and lower arms, respectively, are connected together by the latching assembly 12.

In addition, as shown in FIG. 8, to provide added rigidity between the gate arms 108 or 110 and the associated upper and lower supports at the pivot connections 116, the gate arms 108 and 110 are secured to the associated supports in their closed position with sets of movable locking pins 120. The locking pins, as will hereinafter be explained, are operated by the hydraulic system 114 of the assembly.

As shown in FIG. 8, each locking pin 120 extends through holes in an associated support and through an associated alined hole in a gate arm. The locking pins 120 are biased to hold the gate arms in their closed position by leaf springs 122 attached to the associated supports and to the locking pins 120.

Referring now to FIG. 7, the latching assembly 112 for the gate arms is shown. The gate arms 108 and 110 are formed with nestable cross sections and alined through-holes. The latching assembly 112 for securing the gate arms together in their closed position includes four locking pins 130 mounted on two movable mounting plates 132. The mounting plates 132 are mounted on tension springs 134 attached to the lower gate arms 110. This arrangement tends to bias the locking pins 130 for maintaining the gate arms 108 and 110 in their closed position. As will hereinafter be explained, the locking pins are shifted for opening the gate arms 108 and 110 by the hydraulic cylinder of the hydraulic system 114.

The hydraulic system 114 for operating the gate assemblies is a closed loop system which includes a pair of master cylinders M1 and M2 for each gate assembly 92, a pair of actuator arms 140 and 142 for actuating the master cylinders M2 and M1, respectively, and pairs of hydraulic cylinders 144, 146, 148, and 149 operate the latching pins 130 and locking pins 120 at the lower pivot connections, respectively, for the lower arm 110. Hydraulic cylinders 148a and 149a operate the upper locking pins 120 for the upper pivot arms 108. The master cylinder M1 and hydraulic cylinders 144, 146, 148 and 149 are coupled to one another by suitable flow lines or conduits 160. The master cylinder M2 and hydraulic cylinders 148a and 148b are coupled to one another by flow lines 160a.

In operation, the gate-type apparatus 90 is guided by the helicopter so that the actuator arms 140 and 142 of the hydraulic system 114 successively contact the cross supports 20 of the support towers 14. Upon contact with a cross support 20 actuator arms 140 and 142 are moved by the forward motion of the helicopter so that actuator pins 147 on each actuator arm contact the master cylinder for the system. The actuated master cylinders then push hydraulic fluid through the conduits 160, which causes the hydraulic cylinders 144 and 146 and the hydraulic cylinders 148 and 150 at the pin connections to extend.

The latching pins 130 and 120 are thus moved against the bias of the springs, allowing the gate arms 108 and 110 to swing to their open position shown in fathom. After a gate assembly 92 has passed through a cross support 20 the tension springs 115 for the gate arms 108 and 110 close the arms and the springs 134 and 122 for the latching pins 130 and 120 move the pins for latching the arms.

Because only one gate assembly 92 at a time is open when passing through a cross support 20, the apparatus 90 maintains its rigidity and the sock line 30 can be successively threaded through each support tower 14.

Referring now to FIGS. 11 and 12, a ram-type stringing apparatus 150 shown generally comprises a support member 152, a stationary clip fastener assembly 154 for the sock line 30, and a movable ram fastener assembly or threading member 156 for the sock line 30.

The support member 152 is an inverted, generally U-shaped frame structure fabricated out of welded structural steel or the like. Support member 152 includes two parallel-spaced side portions 162 and 164 and a top portion 166 attached to the side portions 162 and 164 at right angles thereto. In addition, the support member 152 includes an angled side portion 168 attached to the top portion 166 and a side portion 164 for mounting the ram fastener assembly 156.

A pair of eyelet fasteners 169 and 170 are attached to the top member 166 of the support frame 152 in spaced relation to one another for attaching the apparatus 150 to the hoist line 54.

The stationary clip fastener assembly 154 of the apparatus 150 is constructed and arranged to retain the sock line 30 and comprises a pair of laterally spaced spring steel clips 171 and 172 of a generally C-shape attached to the lower inside end portion of side member 162 of the support frame 152. As shown in FIG. 11, the spring steel clips 171 and 172 are mounted on two parallel-spaced mounting plates 174 and 176, respectively, that are welded or similarly fixedly attached to side portion 162 of the support member 152.

For releasably attaching the sock line 30 to the stationary clip fastener assembly 154, the sock line is fixedly attached to a laterally extending, generally cylindrical mounting pin 180 that is sized to fit into and be temporarily retained between the spring steel clips 171 and 172. As shown in FIG. 11, when attached to the stationary clip fastener assembly 154 the sock line 30 is passed between mounting plates 174 and 176 of the assembly and the mounting pin 180 attached to the sock line 30 is retained between the spring clips 171 and 172.

The movable ram fastener assembly 156 is a pull-push means designed to thread the sock line 30 through a line-holding structure on a tower 14 and as shown includes a hydraulic cylinder 190 and a spring steel clip 192 mounted to the end of a smaller axially movable cylinder rod 191. The hydraulic cylinder 190 preferably is extended and retracted by a conventional hydraulic system mounted in the helicopter 10. Fluid flow hydraulic lines 195 and 196 are shown extending from opposite sides of the cylinder 190 along the support member 152 and up the hoist line 54 so that the cylinder 190 may be controlled from inside the helicopter.

The hydraulic cylinder 190 is mounted to the lower inside end of side portion 164 and angled side member 168 with a larger cylinder rod 194 that telescopies in cylinder 193 and a smaller cylinder rod 191 that telescopes and is slidable in rod 194 in a double telescoping structure. The cylinder 190 and rods are in axial alinement with the space between spring clips 171 and 172 of the stationary clip fastener assembly 154. As shown in FIG. 10, when the cylinder rods 191 and 194 are extended the spring clip 192 on the end of the rod 191 engages the retaining pin 180 for the sock line, and upon retraction of the cylinder rods 191 and 194 the sock line 30 may be pulled out of the stationary clip fastener assembly for threading the sock line 30 through a support tower 14.

The ram-type apparatus 150 strings the line 30 by a method that includes the steps of lowering the apparatus 150 over a tower 14 with the cross support 20 of the tower situated between the side supports 162 and 164 and with the sock line 30 retained by the stationary clip fastener assembly 154, extending the hydraulic cylinder rods of the ram fastener assembly 156 to capture the sock line retaining pin 180 and sock line 30, retracting the hydraulic cylinder rods to pull the sock line out of the stationary clip fastener assembly 154 and thread the sock line through the support tower, raising the stringing apparatus 150 away from the support tower 14 and, once out from the tower, extending the hydraulic cylinder rods to situate the sock line 30 and sock line retaining pin 180 back in the stationary clip fastener assembly 154 for the next tower 14.

Referring now to FIGS. 13 through 16, a ring-type stringing apparatus 200 shown generally comprises a support member 202, a rotary line carrier means in the form of a generally C-shaped ring segment or threading member 204 rotatably mounted to the support member 202, and a drive assembly 206 for rotating the ring segment 204.

The support member 202 is fabricated from welded structural steel members or the like and includes an upper portion 208, two parallel laterally spaced lower support portions 210 and 212, and a plurality of upright parallel-spaced support portions 214 on one side and 215 on the other side attached to the upper portion 208 and lower portions 210 and 212 for rigidifying the structure. A pair of lug or eyelet fasteners 216 and 217 are attached at spaced intervals along the upper support portion 208 to provide a means for attaching the apparatus 200 to the hoist line 54 of a helicopter 10.

The ring segment 204 is rotatably mounted to the support member 202 on sets of upper and lower cam rollers 218 and 219 so as to be freely rotatably mounted to the support member 202 about its geometric center. The sock line 30 is attached to the lower end portion of ring 204 by pin 205. The sets of cam rollers span an arc of about 120°. The ring segment 204 spans an arc of 300°, leaving an access opening of 60°. As arranged, the opening is 30° above and 30° below the horizontal.

The drive assembly 206 for rotating the ring segment 204 includes a drive motor 220 and a drive train coupled between said drive motor and the ring segment which includes a gear ring 222 attached along the inside of the ring segment 204 and a pair of drive gears 224 and 226 drivably coupled to the drive motor 220.

The drive motor 220 may be any suitable type of motor such as an electric gear motor or hydraulic motor. The output shaft of the motor has a double chain sprocket 232 attached thereto for driving the drive gears 224 and 226 for the ring segment 204. An electric power line 221 is shown extending from the motor 220, along the support member 202, and up hoist line 54 to enable the motor 220 to be operated by conventional electric motor controls in the aircraft.

The drive gears 224 and 226 for the ring 204 are rotatably mounted on bearing assemblies 240 attached to support portions 210 and 212. The drive gears 224 and 226 are drivably coupled to the chain sprocket 232 of the drive motor with endless strands of roller chain 250 and 252.

With this arrangement a line is passed or threaded through a series of support towers 14 by a procedure that includes the steps of pulling the stringing apparatus 200 between towers with the access opening of the ring segment 204 facing forward, positioning the sock line ring 204 around the cross support 20 of a tower 14, rotating the ring segment 204 with the sock line 30 attached thereto through an arc of 180° so that the access opening is facing rearwardly with respect to direction of travel, securing the sock line to line supporting apparatus on the tower, moving the stringing apparatus 200 forward again away from the support tower 14 with the cross support passing through the ring opening, and rotating the sock line ring 204 back to its original position for the next tower.

Although the present invention has been described with a certain degree of particularity, it is understood that the present disclosure has been made by way of example and that changes in details of structure may be made without departing from the spirit thereof.

What is claimed is:

1. Stringing apparatus for a line comprising:
   support means;
   fastening means for attaching a hoist line carried by an aircraft to said support means;
   first and second hoist line fasteners spaced from one another on said support means for releasably connecting said support means to the lower end of said hoist line;

first and second tower catches on said support means for releasably engaging portions of a tower to catch hold of and secure said support means to the tower after said hoist line is released from said support means, said first hoist line fastener being in front of said first tower catch and said second hoist line fastener being in front of said second tower catch whereby the hoist line is first secured to said second hoist line fastener and said support means is first secured to the tower by said first catch and advanced relative to the tower by releasing said hoist line from said second hoist line fastener, flying to a position for engaging said first hoist line fastener to move said second tower catch into engagement with said tower and reattach said hoist line to said second hoist line fastener; and threading means operatively associated with said support means to pass an end of a line through a line-holding structure supported by an upper cross support on a tower with no side access while suspended from the aircraft.

2. Stringing apparatus adapted to be suspended from a hoist line carried by an aircraft for passing a sock line through a line-holding structure on a tower, said apparatus comprising:

a support member in the form of an elongated rod;

fastening means for attaching the sock line to a rear end portion of said support member;

first and second hoist line fasteners spaced from one another on said support member and opposite said fastening means for releasably connecting said support member to the end of said hoist line while suspended as by a grappling hook; and first and second tower catches on said support member for releasably engaging portions of said tower to catch hold of and secure said support member to said tower after said hoist line is released from said support member, said first hoist line fastener being at the front of said support member and in front of said first tower catch and said second hoist line fastener being in front of said second tower catch whereby the hoist line is first secured to said second hoist line fastener and said support member is first secured to said tower by said first catch and advanced relative to said tower by releasing said hoist line from said second hoist line fastener, flying to a position for engaging said first hoist line fastener to move said second tower catch into engagement with said tower and reattach said hoist line to said second hoist line fastener, followed by pulling said support member to pull said sock line through a line-holding structure, each of said tower catches having a lug portion on a ring-shaped base portion rotatably mounted on said support to move between a horizontal position and a vertical position, there being stops on said support member to limit the rotation between said positions to an arc of about 90°.

3. A method of aerially stringing a threading line comprising:

suspending a hoist line from an aircraft;

providing an elongated threading member having a leading end and a trailing end arranged to be passed through a window-like line-holding structure on a tower while suspended from above by said hoist line, a threading line being connected to said threading member rearwardly of said leading end;

coupling a coupling portion on the lower end of said hoist line to a trailing coupling part associated with said threading member to suspend said threading member from said hoist line and to releasably connect said threading member to said hoist line;

directing the leading end of said threading member and a front coupling part on said threading member through said structure;

releasably fastening said threading member to said tower with a catch on said threading member;

releasing said hoist line from said trailing coupling part and connecting it to said leading coupling part; and moving said threading member and said threading line through said structure while suspended from said hoist line.

4. Stringing apparatus comprising:

a hoist line carried by an aircraft;

an elongated threading member having a leading end and a trailing end arranged to be passed through a window-like line-holding structure on a tower while suspended from above by said hoist line;

a threading line connected to said threading member rearwardly of said leading end;

a coupling between said hoist line and said threading member having interfitting, releasable, male and female coupling portions, one of said coupling portions being connected to the lower end of said hoist line and the other of said coupling portions being associated with said threading member to suspend said threading member from said hoist line and to releasably connect said threading member to said hoist line for the directed movement of said threading member through said structure while suspended from above, said other coupling portion including a leading coupling part at a forward position on said threading member and a trailing coupling part rearwardly of and spaced from said leading coupling part; and tower catch means for said threading member releasably fastening said threading member to said tower after said hoist line is released from said threading member, said hoist line being coupled to said trailing coupling part for the movement of the leading end of said threading member and leading coupling part through said structure, said catch means engaging the tower, said hoist line being released from said trailing coupling part and coupled to said leading coupling part, said threading member and threading line being moved through said structure while suspended from said aircraft.

5. Stringing apparatus as set forth in claim 4 wherein said tower catch means includes a front tower catch rearwardly of said leading coupling part and a rear tower catch rearwardly of said trailing coupling part, said hoist line being first coupled to said trailing coupling part and said front tower catch engaging the tower, the hoist line then being released from said trailing coupling part and coupled to said leading coupling part and said rear tower catch engaging the tower, followed by the hoist line being released from said leading coupling part and coupled to said trailing coupling part for the movement of the leading end of said threading member and leading part through said structure.

6. Stringing apparatus as set forth in claim 5 wherein said tower catch is between said leading and trailing coupling parts.

7. A method of aerially stringing a threading line as set forth in claim 3 wherein said hoist line is first coupled to said trailing coupling part for travel to the tower for threading and away from the tower after threading.

8. Stringing apparatus as set forth in claim 4 wherein said threading member is in the form of an elongated cylindrical rod.

9. Stringing apparatus as set forth in claim 4 wherein each of said other coupling portions has a lug portion on a ring-shaped base portion rotatably mounted on said support means to move between a horizontal position and a vertical position.

10. Stringing apparatus as set forth in claim 9 including stops on said support means to limit the rotational movement of said base portion between said positions.

11. Stringing apparatus as set forth in claim 4 wherein said first and second tower catches are generally in the form of a hook.

12. Stringing apparatus as set forth in claim 9 wherein said first and second tower catches are opposite said lug portion when said lug portion is in the horizontal position to catch hold of a vertical tower and said catches are at right angles to said lug portion when said lug portion is in the vertical position.

13. Stringing apparatus as set forth in claim 12 wherein said catches are on the same side of said lug portion when the lug portion is in the vertical position to catch hold of the upper cross support on the tower.

* * * * *